No. 702,486. Patented June 17, 1902.
J. H. SAMUELS.
SEEDING MACHINE.
(Application filed Nov. 1, 1901.)
(No Model.) 3 Sheets—Sheet 3.
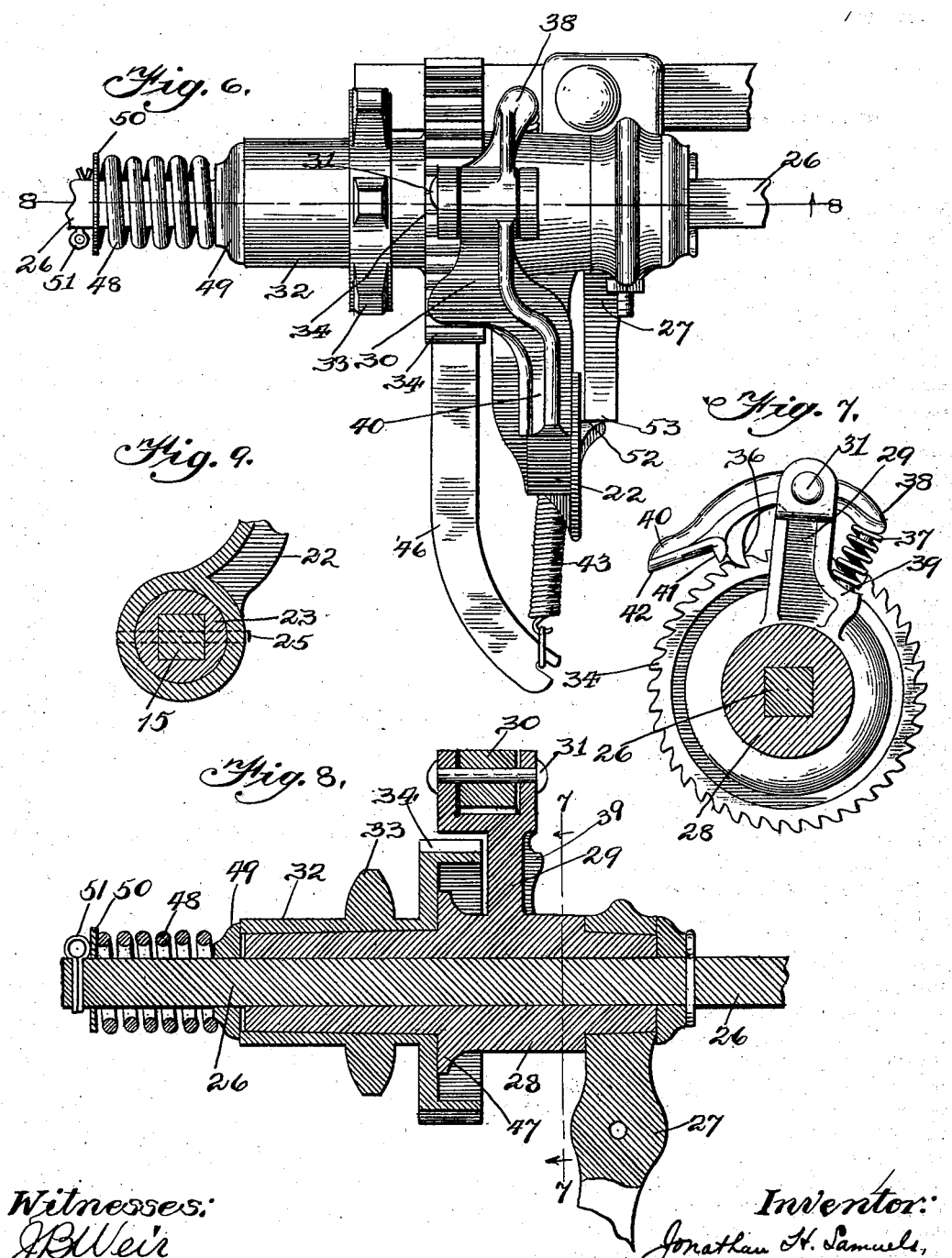
Witnesses:
Inventor:
Jonathan H. Samuels,

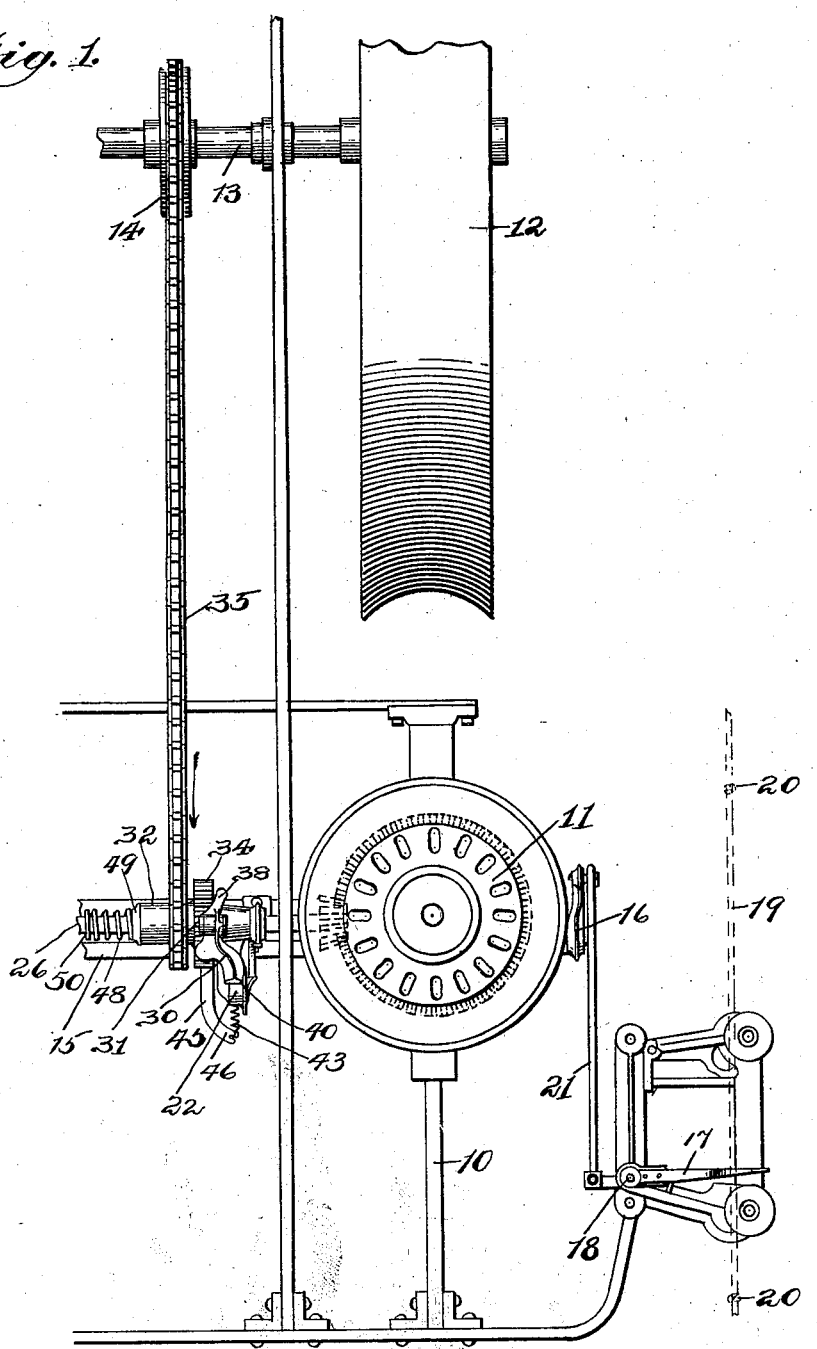

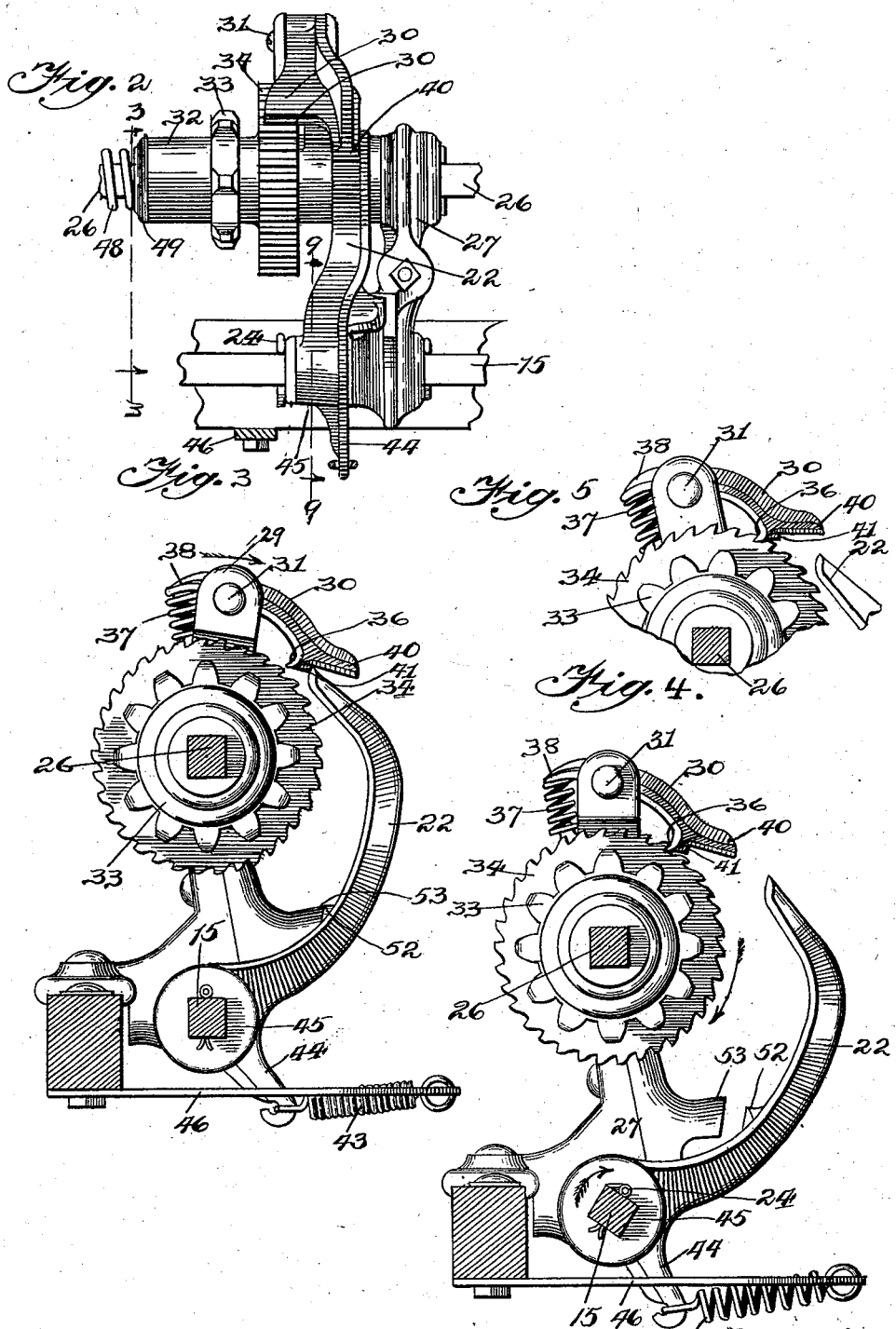

UNITED STATES PATENT OFFICE.

JONATHAN H. SAMUELS, OF MOLINE, ILLINOIS, ASSIGNOR TO D. M. SECHLER CARRIAGE COMPANY, OF MOLINE, ILLINOIS, A CORPORATION OF ILLINOIS.

SEEDING-MACHINE.

SPECIFICATION forming part of Letters Patent No. 702,486, dated June 17, 1902.

Application filed November 1, 1901. Serial No. 80,788. (No model.)

*To all whom it may concern:*

Be it known that I, JONATHAN H. SAMUELS, a citizen of the United States, residing at Moline, in the county of Rock Island and State of Illinois, have invented certain new and useful Improvements in Seeding-Machines, of which the following is a specification, reference being had to the accompanying drawings.

My invention relates to seeding-machines, and has especially to do with the mechanism which controls the delivery of the seed from the seedbox to the seed-tubes and thence to the ground.

It has for its object to provide certain improvements in seeding-machines in which the seed-plate is driven from the carrying-wheels and its operation controlled by means of a check-row wire which operatively connects the seed-plate with the driving devices at stated intervals and also operates the valves in the seed-tubes to deposit in the ground the seed previously received from the seedbox. A machine of this class is described in patent to C. H. and H. L. Dooley, reissued July 23, 1895, No. 11,504. In the best machine of this type known to me it has been the practice to operate the seed-plate by means of a shaft caused to rotate intermittently in the manner above described, for this purpose the shaft being provided with a sprocket-wheel which is loosely mounted thereon and is continuously driven from the carrying-wheels of the planter by means of a link-belt running over a second sprocket-wheel connected with the carrying-wheels. The sprocket-wheel on said shaft has connected to it a clutch member adapted to engage a second clutch member mounted upon and keyed to said shaft, and such clutch members are caused to interlock at stated intervals by the action of the tappets on the check-row wire. Such engagement continues at any one time only during a single rotation of the shaft, since they are automatically thrown out of engagement at the end of each rotation. While the shaft is rotating the rotation of the seed-plate discharges a predetermined quantity of seed into the seed-tube, so that the seed supplied to the seed-tube at any one of the intervals is always the same. The device used to throw the clutch members out of engagement in the apparatus above referred to consists of an arm mounted on a rock-shaft and adapted by the rocking of the shaft to move either into or out of position to throw such clutch members out of engagement, the rocking of said shaft being effected by the tappets on the check-row wire. In such prior device, owing to the construction of the apparatus, it has been necessary to so mount said arm on the rock-shaft as to permit it to rock slightly independently of the shaft, two springs being employed, one acting to throw said arm inward toward the seed-plate and the other acting to return the rock-shaft to its normal position after its being rocked by the check-row wire. One of the features of my present invention is the doing away with the necessity of using one of said springs, so that a single spring may be employed both to restore the rock-shaft to its normal position and to move the arm which throws the clutch members out of engagement into operative position. Another feature of my invention consists in simplifying and improving the construction of the clutch mechanism, as hereinafter described.

What I regard as new will be set forth in the claims.

Referring to the drawings, Figure 1 is a partial plan view of a corn-planter embodying my improvements. Fig. 2 is a partial front view of the controlling mechanism. Fig. 3 is a section on line 3 3 of Fig. 2, showing the throw-out arm in its normal or operative position and the seed-plate shaft disconnected from the drive-wheel. Fig. 4 is a similar view showing the throw-out arm in inoperative position. Fig. 5 is a view of part of the apparatus shown in Fig. 3, showing the position of the parts just before the seed-plate shaft is disconnected from the drive-wheel by the action of the throw-out arm. Fig. 6 is a plan view of the controlling mechanism. Fig. 7 is a section on line 7 7 of Fig. 8. Fig. 8 is a longitudinal section on line 8 8 of Fig. 6, and Fig. 9 is a section on line 9 9 of Fig. 2.

In the drawings, 10 indicates the front frame of a corn-planter; 11, one of the seedboxes;

12, one of the carrying-wheels, and 13 the axle thereof.

14 indicates a sprocket-wheel mounted on the axle 13.

15 indicates a rock-shaft mounted on the front frame 10 and extending transversely of the machine.

16 indicates a crank-arm secured upon and keyed to one end of the rock-shaft 15, as shown in Fig. 1.

17 indicates the usual check-row lever, which in the construction shown is mounted in the usual manner between its ends upon a pivot 18 and is provided with a fork at its outer end, through which passes the check-row wire 19, having tappets 20 at suitable intervals, the arrangement being such that as the machine travels forward the tappets 20, striking the fork of the lever 17, rock it upon its pivot 18, moving the outer end backward. The inner end of the lever 17 is connected by a link 21 with the crank 16, so that when the lever 17 is operated by the tappets on the check-row wire the crank 16 is moved forward, rocking the rock-shaft 15 in the direction indicated by the arrow in Fig. 4. As soon as the tappets 20 release the lever 17 it returns to its normal position by the action of a spring, which will be hereinafter described.

22 indicates an arm which may be termed a "throw-out" arm, because of the function which it performs, as will be hereinafter explained. The throw-out arm 22 is mounted upon the rock-shaft 15 and is secured thereto so as to oscillate therewith. As illustrated in Figs. 2 and 9, said arm 22 is mounted upon a sleeve 23, which fits upon the shaft 15 and is secured in place by a split key 24. (See Fig. 4.) A pin 25, which passes through the shaft 15, sleeve 23, and arm 22, secures all the parts together, so that the arm 22 is rigidly connected with the rock-shaft 15.

26 indicates a rotary shaft which is mounted in suitable bearings in brackets 27, carried by the frame of the machine. Said shaft is connected by the usual gearing with the seed-plate and hopper or seedbox 11, so that the rotation of said shaft causes the seed-plate to rotate. The construction of the seed-plate and the gearing connecting it with the seed-plate shaft 26 are not illustrated in detail, because they are well known and form no part of my present invention, and any suitable devices for the purpose may be employed. A common construction is indicated by dotted lines in Fig. 1.

28 indicates a sleeve which is mounted on the seed-plate shaft 26 and is fixedly secured thereto, so as to rotate therewith. Preferably this action is secured by using a square shaft 26 and providing the sleeve 28 with a square opening, so that it fits thereupon.

29 indicates an arm which is carried by and preferably formed integral with the sleeve 28. Said arm projects from the sleeve 28 and carries near its outer end a pawl 30, which is mounted on a pivot 31, as shown in Figs. 3, 4, and 5. The pawl 30, or a portion thereof, is substantially in the same vertical plane as the arm 22, so that under certain conditions said pawl may be engaged by said arm, as will be hereinafter described.

32 indicates a sleeve which is mounted upon a portion of the sleeve 28 and is adapted to rotate thereon. Said sleeve 32 carries a sprocket-wheel 33, which is preferably formed integral therewith, as shown in Fig. 8. It also carries at one end a ratchet-wheel 34, which preferably is also formed integral with the sleeve 32. The ratchet-wheel 34 lies at that end of the sleeve 32 which is innermost when said sleeve is mounted on the sleeve 28, and when in position it lies under the pawl 30, as best shown in Figs. 2, 3, and 6, and is adapted to be engaged by it. The sprocket-wheel 33 is connected by a chain 35 with the sprocket-wheel 14 on the axle 13, so that when the machine moves forward the upper portion of the chain moving in the direction indicated by the arrow in Fig. 1 causes the sprocket-wheel 33 and ratchet-wheel 34 to rotate in the direction indicated by the arrow in Fig. 4. The teeth of the ratchet-wheel 34 are inclined in the direction shown in Fig. 3, and that portion of the pawl 30 which engages the ratchet-wheel is provided with a hook 36, which is adapted to engage the ratchet-teeth, by which construction when the ratchet-wheel 34 is rotated in the direction indicated it will carry with it the pawl 30 when said pawl is in engagement with it. The hook 36 of the pawl 30 is normally caused to engage the teeth of the ratchet-wheel 34 by a spring 37, mounted between the opposite end 38 of the pawl 30 and an adjacent portion 39 of the arm 29, as shown in Fig. 7. The consequence is that when the pawl 30 is free to act its hook 36 engages the teeth of the ratchet-wheel 34, and consequently the rotation of the ratchet-wheel caused by the forward movement of the machine effects the rotation in a similar direction of the shaft 26, said shaft being keyed to the sleeve 28, which carries the pawl 30. When, however, the pawl 30 is out of engagement with the ratchet-wheel 34, the sprocket-wheel 33 and ratchet-wheel 34 rotate independently of the shaft 26, which remains stationary. The pawl 30 is moved out of engagement with the ratchet-wheel 34 by the arm 22, the upper end of which normally lies in the path of said pawl as it is carried around by the rotation of the ratchet-wheel 34. (See Fig. 2.) As shown in Figs. 2 and 6, a portion of the pawl 30 is deflected to one side, forming a finger 40, which lies directly over the end of the arm 22 and is provided on its under side with a lug 41, with which the end of the arm 22 engages, as shown in Fig. 3. The lug 41 is so placed with reference to the upper end of the arm 22 that when said arm 22 engages said lug the pawl will be held at such a distance from the ratchet-wheel 34, Fig. 3, that the hook 36 will be clear of the ratchet-wheel, and consequently the ratchet-wheel may rotate independently of the pawl. The under surface of the finger 40 is inclined, as shown at 42 in Fig. 7, so that the pawl moves up gradually on the arm 22. When the arm 22 is rocked forward by the action of the check-row wire, it moves out from under the pawl 30, which then drops into engagement with the ratchet-wheel 34 under the action of the spring 37.

The arm 22 is held normally in its operative position by the action of a spring 43, one end of which is connected to a short arm 44, carried by the hub 45, by means of which the arm 22 is secured upon the rock-shaft 15, the other end of said spring being connected to a bracket 46, secured to the frame of the machine, as shown in Figs. 1, 3, and 6. The spring 43 tends to pull the arm 44 forward, consequently throwing the arm 22 back into its operative position. At the same time this action of the spring 43 tends to rock the shaft 15 in a direction opposite to that in which it is rocked by the action of the check-row wire. Consequently said spring 43 serves to return the lever 17 to its normal position after it has been operated by the check-row wire, a single spring sufficing for both purposes.

As shown in Fig. 8, the inner face of the ratchet-wheel 34, which is preferably more or less hollow, as shown, abuts against the flat face of an annular flange 47, carried by the sleeve 28, and it is held closely in frictional contact therewith by means of a spring 48, mounted on the shaft 26, as best shown in Figs. 6 and 8. The spring 48 is confined between a collar 49 at one end and a disk 50 at the other, a split key 51 serving to hold the disk 50 in place. The collar 49 bears against the outer end of the sleeve 32. Consequently the spring 48 acts to force the inner face of the ratchet-wheel 34 against the flange 47 and hold said parts tightly in frictional contact. While this does not materially affect the rotation of the sprocket-wheel 33 and ratchet-wheel 34 independently of the sleeve 28 when the sprocket-wheel 33 is driven from the carrying-wheels, the frictional engagement of the parts is sufficient to prevent their moving freely independently of each other unless considerable power is applied to one or the other. The object of this arrangement is to prevent reverse movement of the arm 29 and pawl 30—that is to say, movement in the direction indicated by the arrow in Fig. 3—under the action of the spring 37. For example, when the parts are in the position shown in Fig. 3, the pawl 30 being out of engagement with the ratchet-wheel 34, if it were not for the frictional engagement of the ratchet-wheel 34 with the flange 47 there would be nothing to prevent the pawl 30 from moving in the opposite direction, (indicated by the arrow in Fig. 3,) and consequently into engagement with the ratchet-wheel 34. This it has a natural tendency to do, since the action of the spring 37 tends to force the hook 36 toward the ratchet-wheel 34, and if the arm 29, which carries the pawl 30, were free to move in the direction indicated by the arrow in Fig. 3 it would do so under the stress of the spring 37, and consequently the hook 36 would engage the teeth of the ratchet-wheel. Of course immediately after this engagement the pawl 30 would again be carried into contact with the arm 22 by the rotation of the ratchet-wheel 34 in the opposite direction, and the pawl would again be thrown out of engagement with the ratchet-wheel; but as soon as it disengaged the ratchet-wheel it would again move back into engagement in the manner above described, so that the pawl would constantly be engaging and disengaging the ratchet-wheel, consequently causing wear on the teeth and pawl, besides causing an objectionable clicking and more or less vibration of the machine. By the frictional engagement of the ratchet-wheel 34 and flange 47, however, this is avoided, since, as above described, the friction between the parts is sufficient to counteract the tendency of the pawl 30 to move backward under the action of the spring 37, and accordingly the pawl remains stationary in engagement with the upper end of the arm 22 except when said arm moves out from under it under the action of the check-row wire. The arm 22 is prevented from moving inward too far by means of a stop 52, carried by it, which engages another stop 53, carried by the standard 27.

The sprocket-wheel 33 and ratchet-wheel 34 are constantly rotated in the direction indicated by the arrow in Fig. 4 while the machine is moved forward; but, as will be evident from the foregoing description, the seed-plate shaft 26 is not affected by such rotation except at stated intervals, because the pawl 30, which connects it with the ratchet-wheel 34, is held out of engagement with the ratchet-wheel by the arm 22. When, however, one of the tappets on the check-row wire engages the lever 17, it rocks said lever, carrying the crank 16 forward and rocking the rock-shaft 15 in the direction indicated by the arrow in Fig. 4, moving the arm 22 out from under the pawl 30 and permitting said pawl to drop into engagement with the ratchet-wheel 34. The continued rotation of the ratchet-wheel thereupon causes the arm 29 and sleeve 28 to rotate, the shaft 26 of course rotating also. Immediately upon the release of the lever 17 by the tappet 20 of the check-row wire it is returned to its normal position by the action of the spring 43, which also returns the arm 22 into position to engage the finger 40 of the pawl 30 as it is carried around by the rotation of the ratchet-wheel 34. The shaft 26 therefore rotates only once for each actuation of the lever 17. As soon as the pawl 30 reaches the arm 22 its finger 40 rides up on the point of the arm 22, moving out of engagement with the ratchet-wheel 34, which continues its rotation independently of the pawl 30, and consequently independently of the seed-plate shaft 26. The parts are so adjusted that a single rotation of the seed-plate shaft 26 moves the seed-plate far enough to deposit the requisite number of seeds in the seed-tube, and consequently as the seed-plate shaft is rotated once and only once as the machine passes from one tappet to another of the check-row wire the depositing of the same quantity of seed in every hill is insured, the only possibility of variation lying in the fallibility of the seed-plate itself.

I have described my improvements specifically as illustrated; but I wish it to be understood that my invention is not restricted to the specific details of the construction shown and described except in so far as such details are particularly claimed. Furthermore, my invention is not restricted in its application to corn-planters alone, but may be used in other seeding-machines in so far as it is applicable thereto.

In regard to my improved clutch mechanism it is evident that my invention, broadly considered, is not restricted to use only in combination with the specific form of throw-out arm herein described or to mounting such arm rigidly on the rock-shaft, although in a more restricted sense such combinations are included in and form part of my invention.

That which I claim as my invention, and desire to secure by Letters Patent, is—

1. The combination of a seed-plate shaft, driving mechanism, clutch mechanism for connecting said seed-plate shaft with said driving mechanism for rotating said shaft, a rock-shaft, and a throw-out device mounted on and rigidly connected to said rock-shaft for operating said clutch mechanism to disconnect said seed-plate shaft from said driving mechanism, substantially as described.

2. The combination of a seed-plate shaft, driving mechanism, clutch members adapted to connect said seed-plate shaft with said driving mechanism for rotating said shaft, a rock-shaft, and a throw-out arm rigidly connected to said shaft and normally lying in position to hold said clutch members out of engagement, and being moved by the rocking of said rock-shaft to permit said clutch members to engage, substantially as described.

3. The combination of a seed-plate shaft, driving mechanism, clutch mechanism for connecting said seed-plate shaft with said driving mechanism for rotating said shaft, a rock-shaft, a throw-out device mounted on and connected to said rock-shaft for operating said clutch mechanism to disconnect said seed-plate shaft from said driving mechanism, and a spring for normally holding said throw-out device in operative position, substantially as described.

4. The combination of a seed-plate shaft, driving mechanism, clutch mechanism for connecting said seed-plate shaft with said driving mechanism for rotating said shaft, a rock-shaft, a throw-out device mounted on and rigidly connected to said rock-shaft for operating said clutch mechanism to disconnect said seed-plate shaft from said driving mechanism, a check-row-wire-operated lever for rocking said rock-shaft, and a spring for normally holding said throw-out device and said check-row-wire-operated lever in operative position, substantially as described.

5. The combination of a seed-plate shaft, driving mechanism, clutch members adapted to connect said seed-plate shaft with said driving mechanism for rotating said shaft, a rock-shaft, a throw-out arm rigidly connected to said shaft and normally lying in position to hold said clutch members out of engagement, and being moved by the rocking of said rock-shaft to permit said clutch members to engage, a check-row-wire-operated lever for operating said rock-shaft, and a spring for normally holding said lever and said throw-out arm in operative position, substantially as described.

6. In a corn-planter, the combination of driving-wheels, a seed-plate shaft, a clutch member carried by said shaft and adapted to rotate independently thereof, means connecting said clutch member with the carrying-wheels, whereby it will be rotated by the forward movement of the planter, a clutch member carried by said seed-plate shaft and fixedly secured thereto, said clutch member being adapted to engage said first-mentioned clutch member for rotating said shaft, a rock-shaft, a throw-out device mounted on and rigidly secured to said shaft, said throw-out arm being adapted to disconnect said clutch members when in its normal position, a spring for holding said throw-out device in its normal position, and a check-row-wire-operated lever for rocking said shaft to move said throw-out device out of its operative position, substantially as described.

7. The combination of a seed-plate shaft, a clutch composed of a ratchet-wheel and a pawl, one of said clutch members being rigidly connected to said shaft so as to rotate therewith, means operated by the forward movement of the machine for rotating the other clutch member, and throw-out mechanism for disconnecting said clutch members, consisting of a rock-shaft, a throw-out arm rigidly mounted thereon, and means for rocking said shaft, substantially as described.

8. The combination of a seed-plate shaft, a clutch composed of a ratchet-wheel and a pawl, one of said clutch members being rigidly connected to said shaft so as to rotate therewith, means operated by the forward movement of the machine for rotating the other clutch member, throw-out mechanism for disconnecting said clutch members, consisting of a rock-shaft, a throw-out arm rigidly mounted thereon, means for rocking said shaft, and a spring normally holding said throw-out arm in operative position, substantially as described.

9. The combination of a seed-plate shaft, a clutch composed of a ratchet-wheel and a pawl, one of said clutch members being rigidly connected to said shaft so as to rotate therewith, means operated by the forward movement of the machine for rotating the other clutch member, throw-out mechanism for disconnecting said clutch members, consisting of a rock-shaft, a throw-out arm rigidly mounted thereon, a lever for rocking said shaft, and a spring normally holding said rock-shaft and lever in operative position, substantially as described.

10. The combination of a seed-plate shaft, a clutch composed of a wheel having ratchet-teeth on its periphery and a pawl adapted to engage said ratchet-teeth, one of said clutch members being rigidly connected to said shaft so as to rotate therewith, means operated by the forward movement of the machine for rotating the other clutch member, and throw-out mechanism for disconnecting said clutch members at intervals, substantially as described.

11. The combination of a seed-plate shaft, a clutch composed of a wheel having ratchet-teeth on its periphery and a pawl adapted to engage said ratchet-teeth, one of said clutch members being rigidly connected to said shaft so as to rotate therewith, means operated by the forward movement of the machine for rotating the other clutch member, and throw-out mechanism for disconnecting said clutch members, consisting of a rock-shaft, a throw-out arm mounted thereon and adapted when in operative position to intercept said pawl and move it out of engagement with said ratchet-wheel, and means for rocking said shaft, substantially as described.

12. The combination of a seed-plate shaft, a clutch composed of a ratchet-wheel and a pawl, said pawl being rigidly connected with said shaft so as to rotate therewith, means operated by the forward movement of the machine for rotating said ratchet-wheel, a throw-out arm for disconnecting said pawl and ratchet-wheel, said arm being adapted to lie normally in a position to intercept said pawl, friction mechanism for holding said pawl closely in engagement with said throw-out arm when it is disengaged from said ratchet-wheel, and means for moving said throw-out arm out of engagement with said pawl, substantially as described.

13. The combination of a seed-plate shaft, a clutch composed of a ratchet-wheel and a pawl, said pawl being rigidly connected to said shaft so as to rotate therewith, means operated by the forward movement of the machine for rotating said ratchet-wheel, and a throw-out arm for disconnecting said pawl with said ratchet-wheel, said ratchet-wheel and pawl having friction bearing-surfaces between them, substantially as and for the purpose specified.

14. The combination of a seed-plate shaft, a clutch composed of a ratchet-wheel and a pawl, said pawl being rigidly connected to said shaft so as to rotate therewith, means operated by the forward movement of the machine for rotating said ratchet-wheel, a throw-out arm for disconnecting said pawl with said ratchet-wheel, said ratchet-wheel and pawl having friction bearing-surfaces between them, and a spring for pressing said friction bearing-surfaces together, substantially as described.

15. The combination of a seed-plate shaft, a ratchet-wheel loosely mounted thereon, a pawl carried by said shaft and rigidly connected thereto so as to rotate therewith, said pawl being adapted to engage said ratchet-wheel, means operated by the forward movement of the machine for rotating said ratchet-wheel, said ratchet-wheel and pawl having friction bearing-surfaces between them for causing the pawl to clear the teeth of the ratchet, a spring for pressing said ratchet-wheel and pawl together, a throw-out device for disconnecting said pawl with said ratchet-wheel, and means for moving said throw-out device to permit said pawl to engage said ratchet-wheel at intervals, substantially as described.

16. The combination of a seed-plate shaft, a ratchet-wheel loosely mounted thereon, a pawl rigidly mounted on said shaft so as to rotate therewith, a sprocket-wheel connected with said ratchet-wheel, a spring on said shaft, said spring acting to press said ratchet-wheel and pawl together, a throw-out arm adapted normally to intercept said pawl and move it out of engagement with said ratchet-wheel, a rock-shaft upon which said throw-out arm is mounted, a spring for holding said throw-out arm in operative position, and a lever for rocking said shaft, substantially as described.

JONATHAN H. SAMUELS.

Witnesses:
MORRIS GEISMAR,
W. A. ROSENFIELD.